US012325116B1

(12) United States Patent
Moore et al.

(10) Patent No.: US 12,325,116 B1
(45) Date of Patent: Jun. 10, 2025

(54) GREASELESS HYDRAULIC HAMMER

(71) Applicant: Caterpillar Inc., Peoria, IL (US)

(72) Inventors: Cody Moore, Robinson, TX (US); Curtis A. Henning, Dunlap, IL (US); John Kevin Clemons, Wamego, KS (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/657,919

(22) Filed: May 8, 2024

(51) Int. Cl.
*B25D 17/08* (2006.01)
*B25D 17/02* (2006.01)
*E02F 3/96* (2006.01)

(52) U.S. Cl.
CPC ............. *B25D 17/08* (2013.01); *B25D 17/02* (2013.01); *B25D 2250/111* (2013.01); *B25D 2250/125* (2013.01); *E02F 3/966* (2013.01)

(58) Field of Classification Search
CPC .. B25D 17/08; B25D 17/02; B25D 2250/111; B25D 2250/125; E02F 3/966
See application file for complete search history.

(56) References Cited

U.S. PATENT DOCUMENTS

| | | | |
|---|---|---|---|
| 5,040,618 A | 8/1991 | Morrison et al. | |
| 5,396,965 A * | 3/1995 | Hall .......................... | E21B 4/14 173/78 |
| 9,592,553 B2 | 3/2017 | Berglund | |
| 10,239,195 B2 | 3/2019 | Moore | |
| 10,493,610 B2 | 12/2019 | Koizumi et al. | |
| 11,613,869 B2 | 3/2023 | Robson | |
| 2023/0124502 A1 | 4/2023 | Henning et al. | |

FOREIGN PATENT DOCUMENTS

| | | |
|---|---|---|
| CN | 218374120 U | 1/2023 |
| JP | H07285124 A | 10/1995 |
| JP | 2020099956 A | 7/2020 |
| WO | WO-2022/119488 A1 | 6/2022 |

OTHER PUBLICATIONS

UK Combined Search and Examination Report for Int'l. Patent Appln. No. GB2406392.7, mailed Nov. 6, 2024 (4 pgs).

* cited by examiner

*Primary Examiner* — Rick K Chang
(74) *Attorney, Agent, or Firm* — Leydig, Voit & Mayer, Ltd

(57) ABSTRACT

A hydraulic hammer includes a housing and a plurality of splines. The housing defines a chamber extending along a longitudinal axis configured to receive a tool. The splines are disposed on an inner surface of the chamber and extend parallel to the longitudinal axis. Each of the splines has a contact surface configured to slidably guide the tool when disposed within the chamber. A treated layer is applied to the contact surface of each spline, the treated layer configured to withstand approximately between 100 MPa to 320 MPa of pressure applied during an operation of the hydraulic hammer without galling. An interface is defined between the contact surface of the splines and a surface of the tool and is configured to facilitate sliding engagement between the treated layer of the contact surface of the splines and the surface of the tool without lubricant during the operation of the hydraulic hammer.

20 Claims, 10 Drawing Sheets

GREASELESS HYDRAULIC HAMMER

TECHNICAL FIELD

This disclosure relates generally to hydraulic hammer systems and more particularly to a hydraulic hammer system having a greaseless interface.

BACKGROUND

Heavy machines may be used to demolish tough material, such as concrete and rock. One example of such a heavy machine may include an excavator equipped with a hydraulic hammer assembly. The hydraulic hammer assembly may be attached at an end of a movable arm of the excavator and connected to a hydraulic system of the excavator. In a typical configuration, the hydraulic hammer assembly may include a hydraulic hammer housing and a work tool secured partially within the hydraulic hammer housing. The hydraulic hammer housing may include surfaces (e.g., wear bushings) that contact the tool while the tool is secured in the hydraulic hammer housing. The hydraulic hammer assembly may also include a reciprocating piston that is driven by high pressure fluid from the hydraulic system. During an operation of the hammer assembly, the reciprocating piston may impact the work tool and the force of the reciprocating piston may be imparted to the material to be demolished via the work tool.

To prevent wear of both the wear bushings and work tool during operation of the hammer, lubricant and/or grease is applied to the hammer via one or more lubricant dispensers. For example, grease/lubricant may be applied via a manual grease dispensing system by an operator applying lubricant to the wear bushings using a grease gun via a grease fitting, zerk fitting, etc. of the hammer housing that feeds grease to the wear bushings. Automated and/or semi-automated grease dispensing systems are present in some hydraulic hammers and include grease reservoirs and automated grease application systems that apply grease to the hydraulic hammer assembly at designated intervals of operation.

SUMMARY

A first aspect provided herein relates to a hydraulic hammer. The hydraulic hammer includes a housing defining a chamber extending along a longitudinal axis configured to receive a tool; a plurality of splines disposed on an inner surface of the chamber, the plurality of splines extending parallel to the longitudinal axis, each of the plurality of splines having a contact surface configured to slidably guide the tool when disposed within the chamber; a treated layer applied to the contact surface of each spline, the treated layer configured to withstand approximately between 100 MPa to 320 MPa of pressure applied during an operation of the hydraulic hammer without galling; and wherein an interface is defined between the contact surface of the plurality of splines and a surface of the tool and is configured to facilitate sliding engagement between the contact surface of the plurality of splines and the surface of the tool without lubricant during the operation of the hydraulic hammer.

A second aspect provided herein relates to a method of assembling a hydraulic hammer. The method includes providing a housing; defining a chamber within the housing, the chamber extending along a longitudinal axis of the housing and configured to receive a tool; providing a plurality of splines, each of the plurality of splines having an outer surface; treating the outer surface of each of the plurality of splines to form a treated layer thereupon; disposing the plurality of splines on an inner surface of the chamber such that each of the plurality of splines extends parallel to the longitudinal axis, each of the plurality of splines having a contact surface, comprising the treated layer, configured to slidably guide the tool when disposed within the chamber; inserting the tool into the chamber such that an interface is defined between the contact surface of each of the plurality of splines and a surface of the tool during an operation of the hydraulic hammer; and wherein the treated layer is configured to, without lubricant, withstand approximately between 100 MPa to 320 MPa of pressure applied during the operation of the hydraulic hammer without galling.

A third aspect provided herein relates to a method of manufacturing a spline for a hydraulic hammer. The method includes forming the spline with steel having a carbon content greater than about 0.58% by weight, the spline having a longitudinal length of about 4 to 8 inches and an outer surface; and treating the outer surface of the spline with at least one of a carbide coating, a cladding, a carburizing process, a carbonitriding process, or a diamond light carbon (DLC) coating.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

The following detailed disclosure is better understood when read in conjunction with the drawings. Before turning to the figures, which illustrate certain embodiments in detail, it should be understood that the present disclosure is not limited to the details or methodology set forth in the description or illustrated in the figures. It should also be understood that examples and terminology used herein are for the purpose of description only and should not be regarded as limiting.

Figure 1:
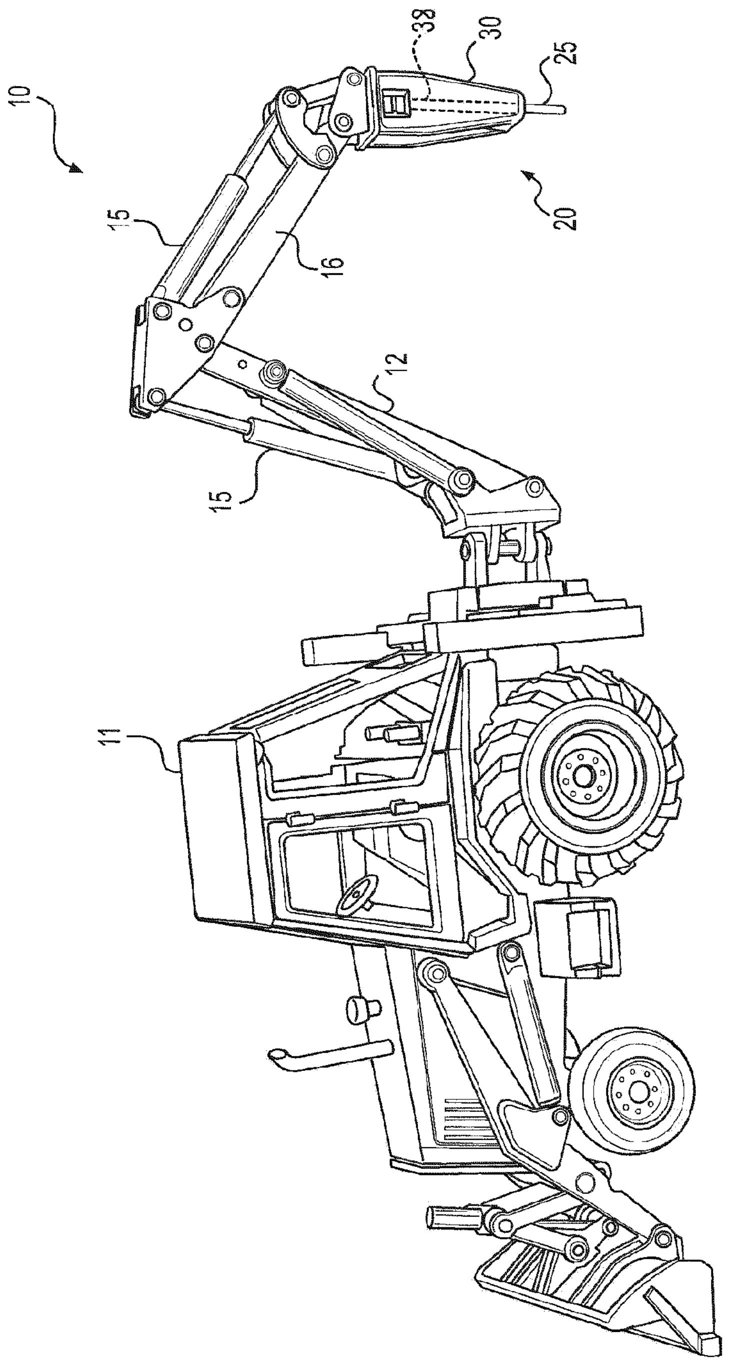
FIG. 1 is a representative machine equipped with an example hydraulic hammer assembly according to an aspect of this disclosure.

FIG. 1 illustrates an exemplary disclosed machine 10 having a hammer assembly 20. The machine 10 may be configured to perform work associated with a particular industry such as, for example, mining or construction. The machine 10 may be a backhoe loader (as shown in FIG. 1), an excavator, a skid steer loader, or any other suitable machine. The hammer assembly 20 may be pivotally connected to the machine 10 through a boom 12 and a stick 16. It is contemplated that another linkage arrangement may alternatively be utilized, if desired.

One or more hydraulic cylinders 15 may raise, lower, and/or swing the boom 12 and the stick 16 to correspondingly raise, lower, and/or swing the hammer assembly 20. The hydraulic cylinders 15 may be connected to a hydraulic supply system (not shown) within the machine 10. Specifically, the machine 10 may include a pump (not shown) connected to the hydraulic cylinders 15 and to the hammer assembly 20 through one or more hydraulic supply lines (not shown). The hydraulic supply system may introduce pressurized fluid, for example oil, from the pump and into the hydraulic cylinders 15 and/or the hammer assembly 20. Operator controls for movement of the hydraulic cylinders 15 and/or the hammer assembly 20 may be located within a cabin 11 of the machine 10.

The hammer assembly 20 may include a hammer 30 and a tool 25 selectively and operatively couplable to the hammer 30 opposite the stick 16. Driven by the hydraulic supply system, the hammer 30 may provide a reciprocating impact motion (e.g., via a piston 38) to the tool 25, which, in turn, may be applied to a material, such as rock or concrete, in contact with the tool 25. It is contemplated that the tool 25 may include any known tool capable of interacting with the hammer 30. In one embodiment, the tool 25 may include a chisel bit, a demolition chisel, moil point, ramming tool, a blunt chisel, etc.

Figure 2:
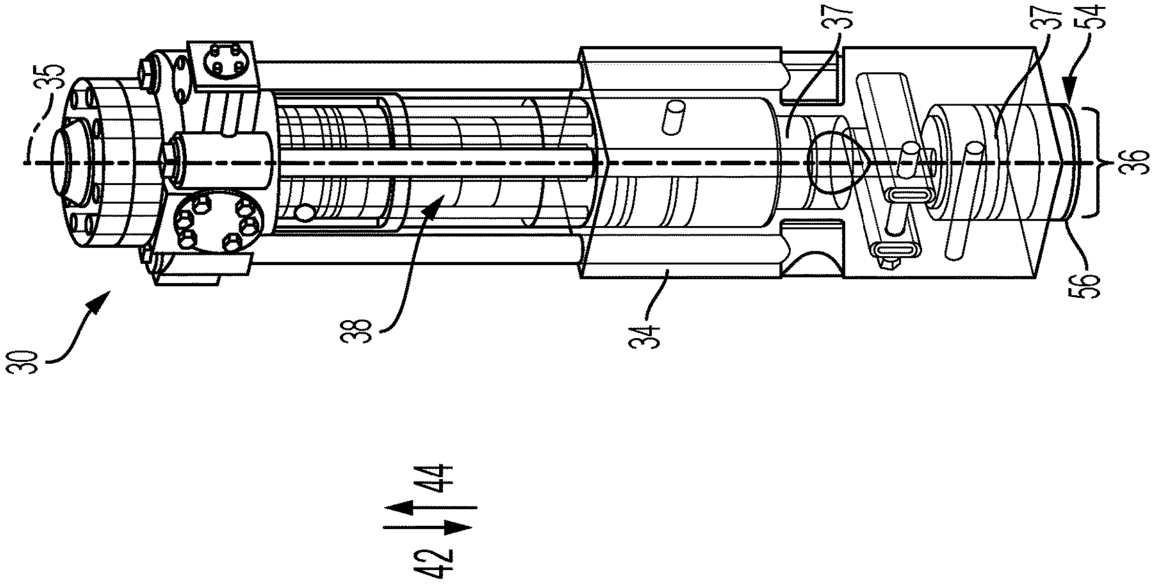
FIG. 2 is a semi-transparent illustration of an example hydraulic hammer according to an aspect of this disclosure.

Turning to FIG. 2, the hammer 30 may include a housing 34 wherein a longitudinal chamber 36 may be defined. The longitudinal chamber 36 may be configured to receive the tool 25 and/or to house a piston 38 such that the piston 38 may reciprocate along a longitudinal axis 35 of the chamber 36 to strike the tool 25. In this way, an inner surface of the longitudinal chamber 36 may include multiple surfaces, wear surfaces, locking mechanisms, or other components with suitable geometries as discussed herein to guide and/or secure at least one of the tool 25, the piston 38, etc. For example, the piston 38 may be movingly disposed within an upper portion 40 (see, e.g., FIG. 3) of the chamber 36. In a work stroke, the piston 38 may move in the direction indicated by an arrow 42 and strike the tool 25 disposed through lower opening 54 defined by a bottom surface 56 of the housing 34 and/or hammer 30. In a return stroke, the piston 38 may move in the direction indicated by an arrow 44. The directions indicated by the arrow 42 and the arrow 44 may generally correspond to the longitudinal axis 35 of the hammer 30 and/or the chamber 36 defined therein. A hydraulic circuit (not shown) may be operatively connected to the hydraulic supply system of the machine 10 and may provide pressurized fluid to cause the piston 38 to alternately reciprocate in the work stroke and the return stroke. In some embodiments, the piston 38 may move about 1.5 inches in a work or return stroke. Although particular sizes and types of hydraulic hammers 30 are depicted and discussed as examples herein, it should be understood that this disclosure applies to any suitable hydraulic hammer 30 of any suitable size.

Figure 3:
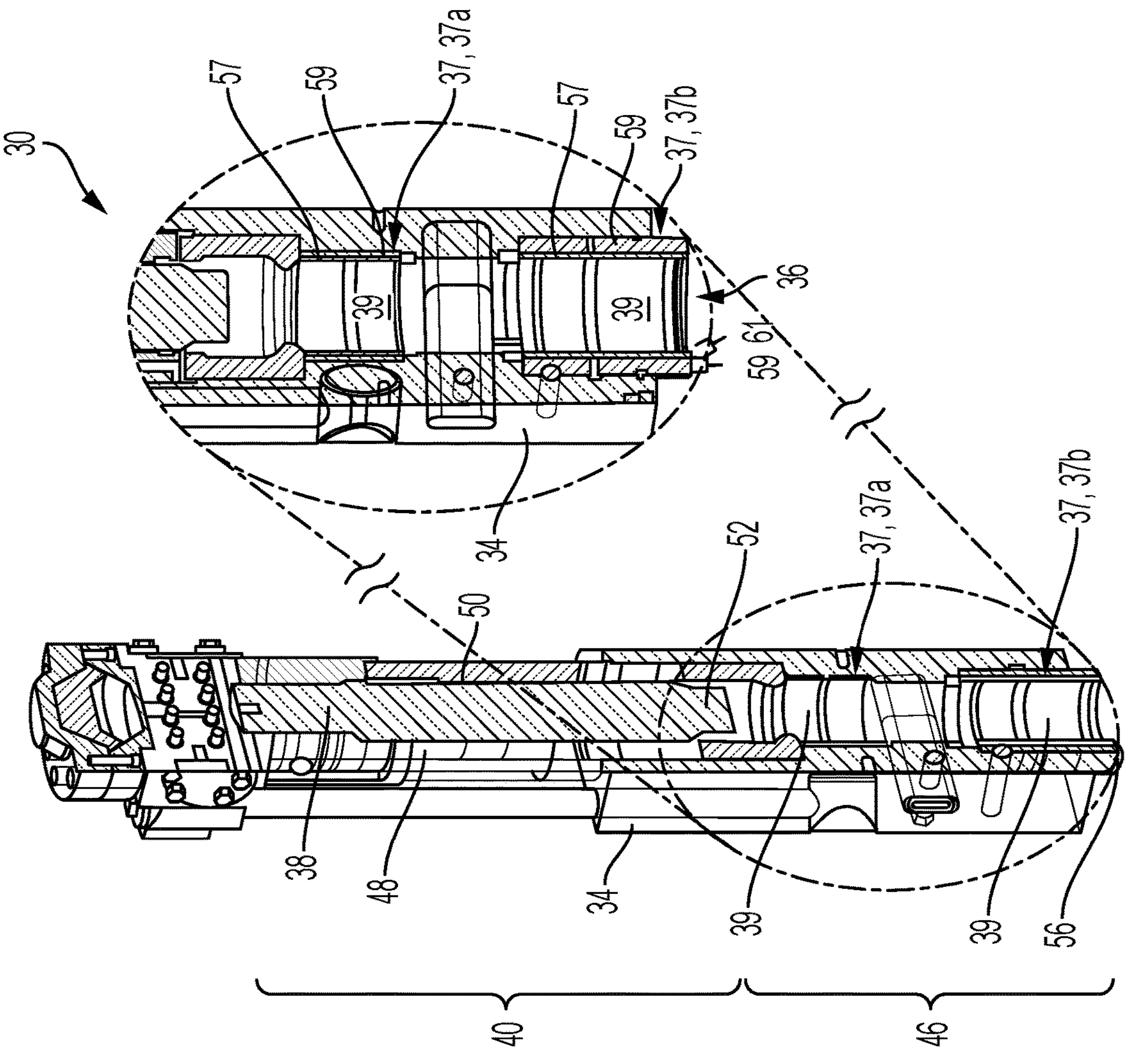
FIG. 3 is a cross-sectional and detailed view of the example hydraulic hammer of FIG. 3.

The hammer 30 may also include one or more support members 37 that may be disposed in the hammer 30, coupled to the housing 34, located at least in part in the chamber 36, or otherwise be configured to support the tool 25 when the tool 25 is operatively coupled to the hammer 30. In this way, the inner surface of the chamber 36 may comprise one or more surfaces of the support members 37. For example, and as shown in FIG. 2, the one or more support members 37 may be located along a circumference of the chamber 36 such that one or more inner surfaces (e.g., contact surfaces as shown in FIG. 3) thereon may abut and/or slidably guide the tool 25 when the tool 25 is disposed within the chamber 36. The support members 37 may define a clearance between the tool 25 and the contact surface 39 when the tool 25 is coupled to the hammer 30 (e.g., disposed in the chamber 36). The clearance may be defined as a gap or space between an inner surface of the support member(s) 37 (e.g., the contract surface 39 and/or a treated layer thereof) and an outer surface (see, e.g., FIG. 8) of the tool 25. In some embodiments, the clearance may be a radial distance between the inner surface of the support member(s) 37 and the outer surface of the tool 25. The clearance may vary based on the duration of an operation of the tool. For example, as the tool 25 and hammer 30 operate, the support members 37 and/or the tool 25 may experience wear and the clearance may increase. In some embodiments, the clearance may be between 2-3 mm or smaller on a "fresh" hammer assembly 20 (e.g., a hammer 30 with support members 37 and a tool 25 with little to no time in operation such as 10 minutes or less of operating time with less than 100 MPa of surface pressure on the tool during operation) and may increase to about 12-14 mm or larger as the operation time and intensity of the hammer 30 and the tool 25 increase.

The clearance defined between the support member(s) 37 and the tool 25 aligns the tool 25 along the longitudinal axis 35 of the chamber 36 and guides the tool 25 during operation of the hammer assembly 20 when the tool 25 is struck by the piston 38. The clearance also provides space to accommodate thermal expansion of the support member 37 and/or the tool 25 during operation such that binding and excessive friction are avoided. Further, the clearance dissipates and/or limits shock, vibration, and the like during operation of the hammer assembly 20 and thereby extends the operational lifetime of the housing 34, tool 25, hammer 30, etc.

Turning to FIG. 3, a cross-sectional view of the hammer 30 is shown as well as a detailed view of a lower portion 46 of the housing 34. The piston 38 may be configured with a longitudinal surface 48 in movable contact with an inner surface 50 of the upper portion 40 of the chamber 36. The piston 38 may further include a bottom surface 52 that strikes the tool 25 upon a work stroke of the piston 38. The longitudinal surface 48 of the piston 38 and the inner surface 50 of the upper portion 40 of the chamber 36 may each comprise a smooth surface. The chamber 36 may further include a lower portion 46 wherein a portion of the tool 25 may be situated for operation of the hammer 30 and the hammer assembly 20. The lower portion 46 of the chamber 36 may longitudinally extend from the bottom surface 52 of the piston 38 to an opening 54 defined by a bottom surface 56 of the housing 34, the hammer 30, and/or the support member 37. The lower portion 46 of the chamber 36 may be configured to allow quick attachment and/or removal of the tool 25 to and/or from the hammer 30.

The support members 37 of the hammer 30 are configured to slidably guide the tool 25 during operation of the hammer 30. Notably, the support members 37 discussed herein may comprise a treated layer 57 forming at least a portion of a contact surface 39 of the support members 37. In this way, the tool 25 contacts the treated layer 57 of the contact surface 39 during operation of the hammer 30 such that a greaseless interface is defined therebetween. As discussed herein, the greaseless interface may allow the hydraulic hammer assembly 20 to operate and/or demolish materials such as rock, concrete, and the like without application of lubricant, grease, etc. to the tool 25, support members 37, contact surfaces 39, and/or the treated layer 57 thereof. Beneficially, removing the need for grease, lubricants, and the like applied to the contract surfaces 39 and/or tool 25 reduces the operating costs and increases the range of operation of the hammer assembly 30 disclosed herein. For example, costs associated with acquiring grease and downtime to apply grease/lubricant may be eliminated. Further, time spent continuously operating the hammer assembly 30 may extend by eliminating the need to stop operations to re-apply grease. Additionally, the hammer assembly 30 may be operable in a greater number of worksites compared to conventional (e.g., greased) hammer assemblies, such as work sites subject to regulations that prohibit/limit the use of equipment that drip/leak grease.

One or more support member(s) 37 may be disposed in the chamber 36 and the one or more support member(s) 37 may be located in a variety of configurations, shapes, and sizes. For example, the support members 37 shown in FIG. 3 include an upper support member 37*a* and a lower support member 37*b*. In other embodiments, one or more support members 37 may extend along the longitudinal axis 35 of the chamber 36 or may be disposed at multiple locations within the chamber 36. For example, the chamber 36 may include one, two, three, four, etc. concentric rows of support members 37, parallel groupings of support members 37, and the like at various locations along the length/perimeter of the chamber 36. In another example, one or more support member(s) 37 may extend continuously or in segments along the direction of the longitudinal axis 35 of the chamber 36. In other embodiments, only a single support member 37 may be included in the chamber 36 or the support members 37 may be staggered, disposed in a spiral formation, or otherwise located in the chamber 36 in any other suitable location, orientation, or position. For example, the support members 37 may include splines, cut outs (e.g., cavities, indentions, channels, openings, slots, or the like) in the inner surface of the chamber 36, protrusions formed on and/or integral with the inner surface of the chamber 36, roller surfaces, cylindrical rods, trapezoidal bars, etc. in any combinations and/or variations thereof.

In some embodiments, the support members 37 may comprise an outer region 59 of the support member 37 that is more proximate to the housing 34 than a corresponding inner region 61 of the support members 37 which is more proximate to the center of the chamber 36. For example, the inner region 61 of the support member 37 may face the chamber 36 and the outer region 59 may face and/or abut the housing 34. In this way, the inner region 61 may be more proximate to the tool 25 than the outer region 59 during operation of the hammer assembly 20, and one or more surfaces thereof (e.g., the treated layer 57 of the contact surface 39 of the inner region 61) may abut and/or slidably guide the tool 25 during operation of the hammer assembly 20.

During operation of the hammer assembly 20, the tool 25 cycles up and down and may have a variety of forces imparted thereon, including lateral forces that may arise from impact with the material that is to be broken. These forces may be transferred at least in part to the support members 37. In this way, the support member(s) 37 provide a guide for holding the tool 25 in alignment when in use. The support members 37 may be configured to radially surround the tool 25 when the tool 25 is inserted into the chamber 36. In other embodiments, the support members 37 may align with channels, slots, grooves, protrusions, etc. defined by and/or located on the outer surface of the tool 25. As the tool 25 moves axially (or up and down) along its length during use, lateral forces (such as those in a radial and/or lateral direction) may be imparted to the hammer 30 and/or the housing 34 via the support members 37. In some embodiments, the support members 37 may contact/abut the outer surface of the hammer 30 (e.g., the housing 34) and, therefore, provide counter forces to the lateral forces that are imparted to the tool 25 during use of the hydraulic hammer assembly 20.

In some embodiments, the support member 37 is configured to be wear resistant and last longer between replacement by hardening both the inner regions 61 of the support member 37 that are in contact with the hammer 20 and the outer regions 59 of the support member 37 which are more proximate to the housing 34. In this way, the treated layer 57 may be applied to the entire support member 37 (e.g., each surface of the support member 37 includes the treated layer 57, the treated layer 57 forms the entirety of an outer layer of the support member 37, etc.). Specifically, in some embodiments, the surface area of the contact surfaces 39 reduce the contact pressure between the tool 25 and the support members 37 such that the forces transmitted from the tool 25 to the housing 34 are dampened and/or mitigated by the support members 37. In further embodiments, a hardness profile of the support member 37 may be constant, continuous, or otherwise uniform across the support member 37. For example, the entire support member 37 may have a hardness of greater than approximately 60 Rockwell Hardness Scale C (HRC). In other embodiments, the support member 37 may include a hardened 'shell' or perimeter having a hardness of greater than approximately 60 and a softer internal region (e.g., a 'core') having a hardness in the range of about 30 HRC to about 60 HRC.

In other embodiments, the support member 37 is configured to be wear resistant and last longer between replacement by hardening the inner regions 61 of the support member 37 that are in contact with the hammer 20 and not hardening the outer regions 59 of the support member 37 which are more proximate to the housing 34. In such embodiments, the treated layer 57 may be applied to the inner region 61 of the support member 37 and/or the contract surfaces 39 thereof, while the treated layer 57 is not applied to the outer region of the support member 37. While in some arrangements hardening the entire support member 37 (e.g., providing/applying a treated surface to the entirety of the support member 37) may be beneficial, in other arrangements, such hardening may result in reduced toughness of the support member 37 and may result in additional forces (e.g., repeated percussive forces) being imparted to the housing 34 via the outer regions 59 of the support members 37. The repeated percussive forces between the hardened outer regions 59 and the housing 34 may degrade the housing 34 and/or other components of the hydraulic hammer 30. In some respects, the disclosure herein may provide for support members 37 that are relatively wear resistant (e.g., are hardened/have a treater layer at the inner region 61) while maintaining a relatively high level of toughness (e.g., are not hardened/do not have a treated layer 57 at the outer region 59).

For example, the support members 37 may have a hardness of greater than approximately 60 Rockwell Hardness Scale C (HRC) proximal to the inner region 61 and may have a bulk hardness of about 35 HRC to about 45 HRC. This allows for a relatively hard, wear resistant inner region 61 of the support member that contacts the outer surface of the tool 25 and a relatively softer outer region 59 of the support member 37 that is in contact/proximate to the housing 34 of the hydraulic hammer 30. In other cases, the support member 37 may have three zones: a hard inner region 61 proximal to the contact surface 39 and/or the treated layer 57 of the support member 37, a soft outer region 59 proximal to the outer surface of the support member 37 and/or facing the housing 34, and an intermediary hardness region between the inner region 61 and the outer region 59. In this case, the inner region may have a hardness greater than approximately 60 HRC, the outer region may have a hardness less than about 45 HRC, and the intermediary region may have a hardness in the range of about 45 HRC to about 60 HRC. It should be understood that the aforementioned hardness values are example values, and that the disclosure herein contemplates other values outside of the ranges indicated. Further, in some embodiments, more or less than three zone/regions of hardness (e.g., one zone/region, four zones/regions, a plurality of zones/regions, or any variation/combination thereof on one or more of the support members 37) may be included and configured within the support member(s) 37.

In some cases, the support member 37 may have a hardness profile that can be defined and/or approximated by any variety of suitable mathematical functions. For example, the hardness may be modeled as a logarithmic function with low hardness in the outer region 59, intermediate hardness in the intermediate region, and high hardness in the inner region 61. In this example, the hardness may start at under about 40 HRC or so near the outer surface, increase in a logarithmic manner, and reach greater than about 60 HRC in the inner region 61 proximal to the center of the chamber 36. The aforementioned logarithmic function is also an example, and indeed any suitable function may define the hardness profile of the support member 37 including, but not limited to, exponential functions, polynomial functions, linear functions, quadratic functions, error functions, combinations thereof, or the like. In some cases, the hardness profile (e.g., the hardness of a steel from the outer region 59 to the inner region 61) of the support member 37 may be defined and/or modeled using a combination of mathematical functions. For example, in one case, the hardness may increase from under 40 HRC near the outer surface in a logarithmic fashion through the outer region and most of the intermediate region, and then increase linearly or have a relatively flat profile through the inner region of the support member 37.

Figure 4:
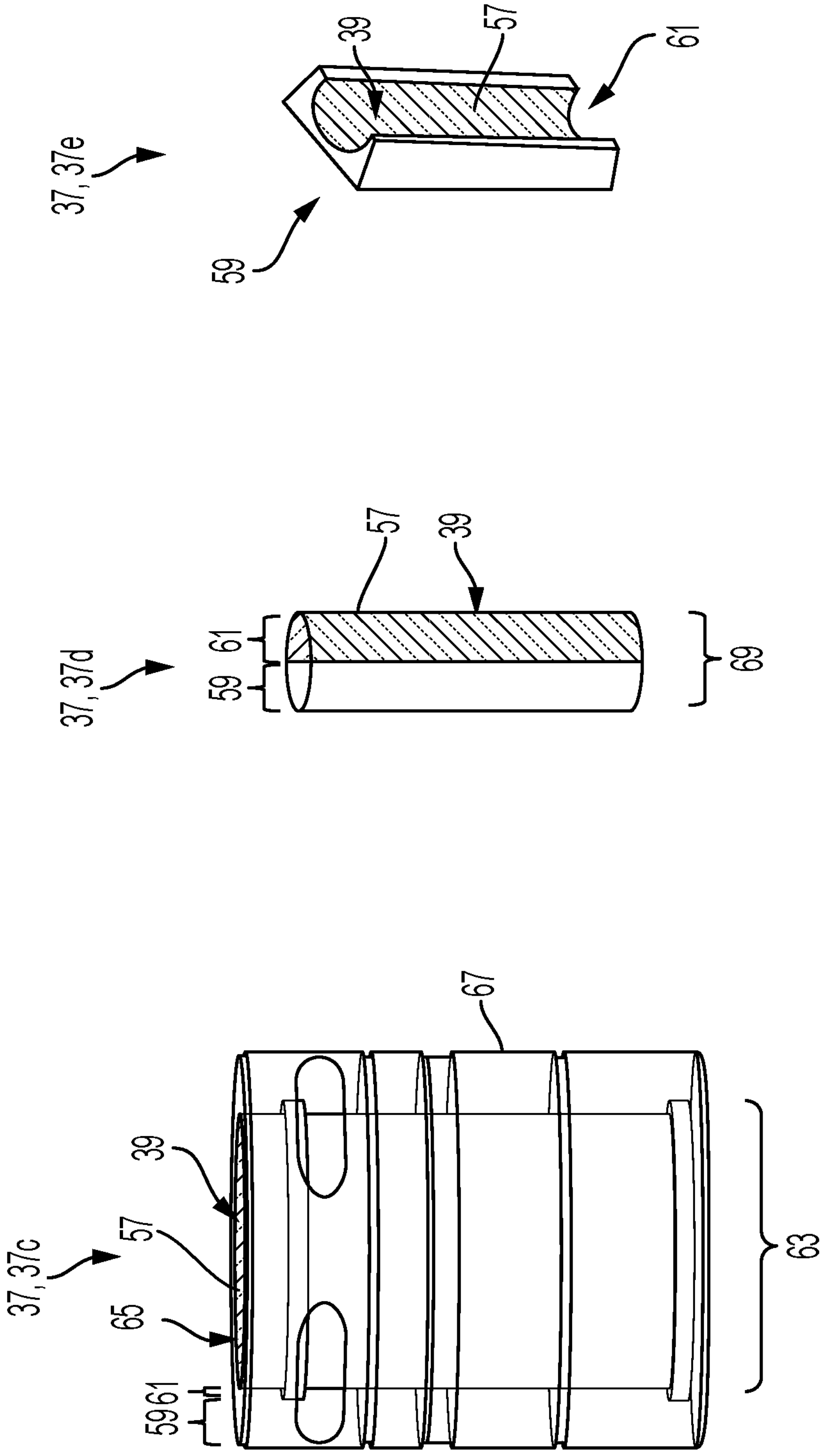
FIG. 4 is an illustration of example support members for a hydraulic hammer according to an aspect of the disclosure.

Turning to FIG. 4, non-limiting examples of various support members 37 are shown. The respective support members 37 are not drawn to scale with respect to one another and support members 37 of the same form/style may individually vary in size from support members 37 of the same form/style, including within a particular hammer 30. A first example support member 37, 37*c* includes a cylindrical shape with a hollow inner opening 63 configured to receive the tool 25. For example, the opening 63 may correspond to and/or define a portion of the inner surface of the chamber 36 when the support member 37, 37*c* is disposed within the hammer 30. The support member 37, 37*c* may have an inner surface 65, at least part of which may comprise the contact surface 39. For example, there may be grooves, carve outs, or protrusions on the inner surface 65 such that only a portion of the inner surface 65 slidably guides and/or contacts the tool 25 when the tool 25 is disposed in the chamber 36. In this way, a treated layer 57 may be applied to all or a portion of the inner surface 65 such that the contact surface 39 has an increased hardness and sufficient surface area to define a greaseless interface between the contract surface 39 and the tool 25 during operation of the hammer assembly 20. The hardness of the support member 37, 37*c* may vary in the radial direction. For example, the hardness of the inner region may be greater than that of the hardness of the outer region 59. The outer region 59 may end at an outer surface 67 of the support member 37. The outer surface 67 of the support member 37 may abut and/or be configured to dampen/transfer forces from the tool 25 to the housing 34 to reduce degradation of the housing 34.

Figure 5:
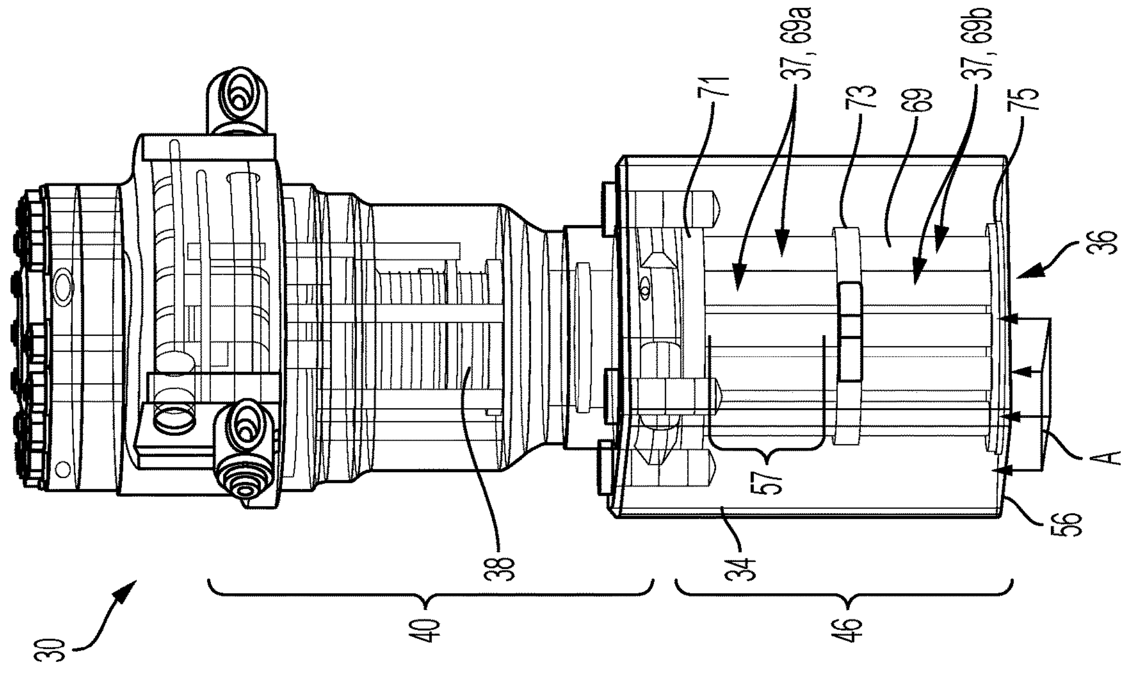
FIG. 5 is a semi-transparent illustration of an example hydraulic hammer according to an aspect of this disclosure.

Also shown in FIG. 4, a second example support member 37, 37*d* may be in the form of a cylindrical rod and/or spline 69. In other embodiments, the spline 69 may be hexagonal, rectangular, triangular, or may have any other suitable external form, contours, or outline. The spline 69 may be one of a plurality of splines 69 and/or support members 37 disposed/located in the chamber 36 and configured to support the tool 25. For example, as shown in FIGS. 5 and 8, multiple splines 69 may be arranged along the circumference of the chamber 36 such that upper and lower pluralities of splines 69 are configured to surround and support respective portions of the tool 25. In other variations, one or more of a plurality of splines 69 may be disposed on the inner surface of the chamber 36, the plurality of splines 69 extending parallel to the longitudinal axis 35, each of the plurality of splines 69 having a contact surface 37 configured to slidably guide the tool 25 when disposed within the chamber 36. In some embodiments, the entire outer surface of the spline 69 may be treated such that the treated layer 57 is continuously applied and/or applied to each surface of the spline 69. In the embodiment shown in FIG. 4, the spline 69 is treated only on one side. Accordingly, the spline 69 has hardened portion (e.g., an inner region 61 configured to face the center of the chamber 36 and slidably guide the tool 25) and a relatively softer portion (e.g., an outer region 59 configured to face the housing 34 of the hammer 30). In some embodiments, the spline 69 may include wings, elongated protrusions, slots, or may be coupled to other splines in a ring such that the spline 69 does not rotate around its longitudinal axis when disposed in the chamber 36 and/or coupled to the housing 34. In some embodiments wherein the support member 37 is a spline 69 or other protrusion extending from an inner surface of the chamber 36, the tool 25 may have corresponding cavities, cut outs, slots, indentations, or the like configured to abut and/or slidingly move along the support member 37 (see, e.g., FIGS. 6 and 7). In other embodiments, the splines 69 may be integrally formed with and/or coupled to the chamber 36.

In a third example, the support member 37 may be shaped such that the contact surface 39 is an indentation, cut out, cavity, slot, or the like with respect to the inner surface of the chamber 36. As shown by the support member 37, 37*e* in FIG. 4, the contact surface 39 may be a recess with a cylindrical profile (or other profile such as a hexagonal, rectangular, triangular, etc. profile), a panel including a central slot/recess/channel, or the like. Accordingly, the treated layer 57 may be applied to at least the recessed surface of the support member 37 such that the contact surface 39 and the hardened inner region 61 which abuts and/or slidably guides the tool 25 extends in a radial direction away from the center of the chamber 36. For example, a plurality of support members 37*e* may be arranged in a ring formation or radially around the chamber 36. The tool 25 may have protrusions thereon that are configured to fit inside and/or be received in/against the recess (e.g., the semi-cylindrical channel shown in support member 37*e* of FIG. 4). In this way, the protrusions of the tool 25 may apply force to the recessed contact surface 39 and the treated surface 57 thereof during operation of the hammer assembly 20. In some embodiments, the entire support member 37, 37*e* may be treated, while in other embodiments, an outer region 59 may not be treated such that the outer region is softer than the inner region 61 and/or the treated surface 57. In this way, the support member 37 may provide a relatively high toughness and high resistance to cracking.

Turning to FIG. 5, a semi-transparent embodiment of a greaseless hydraulic hammer 30 is shown. The hammer 30 includes a housing 34 defining a chamber 36 having an upper portion 40 and a lower portion 46. The upper portion 40 may house a piston 38. The upper portion 40 of the chamber 36 may be separated from the lower portion 46 of the chamber 36 by a stop ring 71 (e.g., the stop ring 71 may be located at a boundary of both the upper portion 40 and the lower portion 46). The stop ring 71 may be made of a durable material (e.g., steel) and may be configured to prevent the tool 25 from extending towards the upper portion 40 of the chamber 36 from the lower portion 46 of the chamber 36. Accordingly, the tool 25 may impact the stop ring 71 while the piston 38 is at the pinnacle of its return stroke without leaving the lower portion 46 of the chamber 36 or without causing damage to the hammer 30. The stop ring 71 may be received in a slot, channel, recess, etc. of the housing 34, may be integrally formed with the housing 34, or may be coupled to the housing 34 in another suitable manner. In some embodiments, the stop ring 71 may instead be structured as stopping protrusions or other surfaces configured to prevent further upward movement of the tool 25. The stop ring 71 may be circular, square-shaped, triangular, or any other suitable shape.

In the embodiment shown in FIG. 5, the support members 37 are in the form of splines 69. Unlike the spline 69 shown in FIG. 4, the entire outer surface of the splines 69 in FIG. 5 are treated (e.g., have a treated layer 57 thereon). The tool 25 may be aligned within the chamber 36 such that the outside surface of the tool 25 abuts and/or extends adjacent to the contact surface(s) 39 of the splines 69 (as shown in FIG. 8). The contact surfaces 39 may be of a cylindrical, semi-cylindrical, or other suitable shape and configured to hold and align the tool 25 within the chamber 36 of the housing 34 of the hydraulic hammer 30. Further, the contact surface 39 includes the treated layer 57. In the embodiment of FIG. 5, the treated layer 57 is applied to the contact surface 39 such that the treated layer 57 forms the inner surface and/or an inner region 61 of the support member 37 and extends radially into the chamber 36. In this way, the inner region 61 of the support member 37 may include the treated layer 57 (e.g., may be treated) while the outer region 59 of the support member 37 (e.g., the region/surface of the support member 37 facing the housing 34) may not include the treated layer 57 (e.g., may not be treated).

In some aspects, the support members 37 (e.g., splines 69) are arranged to form an upper plurality of splines 69*a* and a lower plurality of splines 69*b*. The plurality of upper splines 69*a* may be disposed on an upper portion of the inner surface of the chamber 36 and the plurality of lower splines 69*b* may be disposed on a lower portion of the inner surface of the chamber 36. The upper surface of the upper plurality of splines 69*a* may abut and/or be located proximate to the stop ring 71. In some aspects, only one plurality of splines 69 may extend along the length of the lower portion 46 of the chamber 36. For example, each of the plurality of splines 69 may extend from a position proximate the bottom surface 56 of the housing to a position proximate the bottom surface 52 of the piston 38 (e.g., 0.5 inches above/below each respective surface, etc.). The splines 69 may be secured and/or otherwise held inside the housing 34 via an insert 75. The insert 75 may include a ring-shaped end cap, a snap ring, or another suitable interface that prevents the splines from sliding/falling once inserted within the housing 34.

Figure 6:
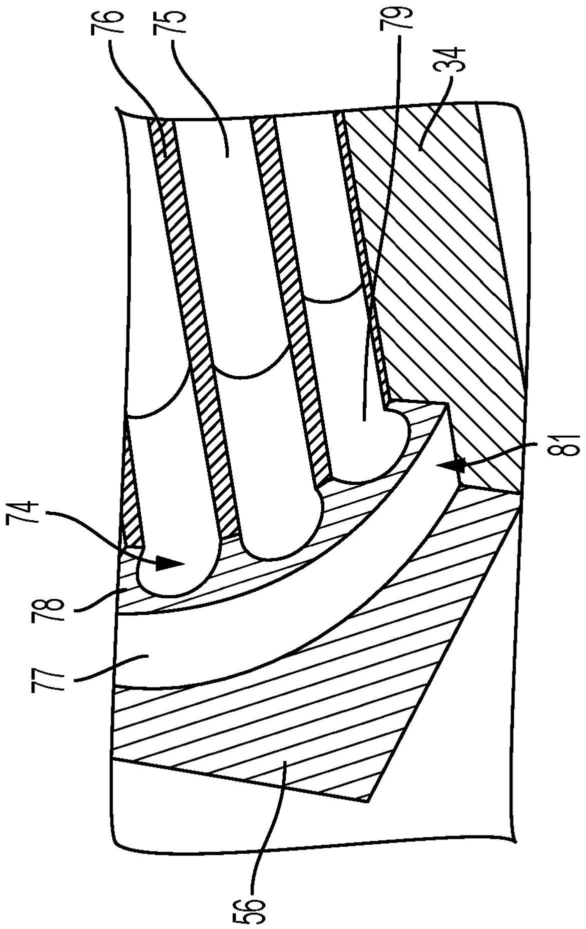
FIG. 6 is a semi-transparent cross-sectional view of the housing of the example hydraulic hammer of FIG. 5, as shown from view A of FIG. 5.

FIG. 6 shows a semi-transparent cross-sectional view of the housing 34 with the splines 69, tool 25, and any inserts 75 removed, viewed from perspective A in FIG. 5. In other words, FIG. 6 shows a segment of the corner of the only the housing 34. The housing 34 may include one or more of (e.g., a single, a plurality of, etc.) channels 74 defined therein by cutting, machining, drilling, cast molding, or another similar formation technique. For example, the cylindrical channels 74 of FIG. 6 are configured to receive one or more of the splines 69 and secure them within the housing 34. In some embodiments, the housing 34 may include recesses, slots, or the like of various shapes and sizes configured to receive the splines 69 and/or other support members 37 described herein. In other embodiments, such as in embodiments where the support members 37 include recessed contact surfaces 39 (e.g., support members 37*e*), the housing 34 may include protrusions, fasteners, or interfaces on/against which to couple the support members 37.

As shown in FIG. 6, a plurality of channels 74 is formed radially around the inner surface of the housing 34 such that each of the plurality of channels 74 may receive one or more of the splines 69. The channels 74 are defined by a support surface 75, shown as having a cylindrical shape to match the profile of the splines 69 configured to be received therein. In other embodiments, the channels 74 may have rectangular, triangular, hexagonal, or other suitably shaped support surfaces 75. The channels 74 may be separated from one another by a ridge 76. The ridge 76 may provide a gap between support members 37 to improve the flow of cooling air in the chamber 34, to provide room for thermal expansion of the components of the hammer 30, or the like. In some embodiments, the ridges 76 may be beveled, rounded, etc. When the splines 69 are inserted into the channels 74, a portion of the splines 69 (e.g., the inner region 61) may extend radially inward towards the longitudinal axis 35 of the chamber 36 beyond the ridge 76 and be more proximate to the tool 25 when the tool 25 is inserted in the hammer 30. The channels 74 may also coincide with the channel, recess, or slot of a locking mechanism 73 and/or the channel 74 may be selectively divided into distinct channel regions (e.g., an upper channel region holding the upper plurality of splines 69*a* and a lower channel region holding the lower plurality of splines 69*b*) by rotation of a locking ring.

The housing 34 may include a circumferential surface 77 extending from and/or normal to the bottom surface 56 of the housing 34 in the longitudinal direction. The circumferential surface 77 may be bounded on a first end by the bottom surface 56 and on a second end by a lower edge 78 of the channels 74. The lower edge 74 may be rounded, beveled, flat (e.g., extending in the radial direction, in a direction parallel to the bottom surface 56, etc.), or shaped in another manner. A cavity 81 may be defined by the bottom surface 56 of the housing 34, the circumferential surface 77, and the lower edge of the channels 74. The cavity 81 may be configured to hold one or more inserts 75 such as the snap ring 114, a ring-shaped end cap 116 (See FIG. 8), an end plate, or the like configured to secure the support members 37 inside the housing and prevent, for example, the splines 69 from sliding out of the housing 34.

One or more portions of the channel(s) 74 may include a hardened layer 79. For example, the hardened layer 79 may be formed at regions of the channel 74 that are likely to receive the highest longitudinal forces transferred from the impacts of the tool 25. Additionally, the ends of the channels 74 may also include a hardened layer 79. In this way, the hardened portions of the channels may be more resistant to wear and deformation. The hardened layer 79 may be formed by carburization, a carbonitride treatment process, an application of a DLC layer, or the like discussed herein. Other hardening techniques or the application/use or materials having a high hardness at the regions of the channels 74 may also be suitable.

Briefly referring back to FIG. 5, the hammer 30 may also include a locking mechanism 73. The locking mechanism may be disposed at least partially within the housing 34. For example, as shown in FIG. 5, the locking mechanism 73 includes a mechanism disposed within the chamber 36 between the plurality of upper splines **69*a* and the plurality of lower splines 69*b*. The locking mechanism 73 is configured to selectively secure the tool 25 within the housing 34 of the hammer 30. For example, the locking mechanism 73 may include a system configured to couple a hydraulic hammer 30 and tool 25** as described in U.S. Pat. No. 10,239,195, which is hereby incorporated by reference in its entirety.

In some aspects, the locking mechanism 73 may include a locking ring rotatable about the longitudinal axis 35 with respect to the housing 34. The locking ring may include one or more (e.g., a plurality of) locking ring interfaces configured to abut the tool 25 in a locked position and configured to slidably engage the tool 25 in an unlocked position, thereby selectively coupling the tool 25 to the hammer 30. In some embodiments, the locking ring interfaces may include protrusions, elongated extensions, recesses, or other interfaces configured to selectively abut and/or slidably guide the tool 25. In some aspects, the locking ring interfaces include one or more locking ring splines disposed on an inner surface of the locking ring. The locking ring splines may be coupled to the locking ring, integrally formed with the locking ring, or the like. The locking ring splines may have a shape similar to that of the splines 69. For example, the locking ring splines may be semi-cylindrical protrusions coupled to the locking mechanism 73 that have the same radius or protrude the same distance into the chamber 36 as the splines 69. The locking ring splines may also have a height that allows for upward and downward movement of the tool 25 (e.g., 0.5 inches of movement, etc.) during operation of the hydraulic hammer assembly 20.

In particular, the locking ring may be rotated within a ring channel, groove, insert, or track so that the locking ring splines misalign with the plurality of upper splines **69*a* and the plurality of lower splines 69*b* in the chamber 36 of the hammer 30 in the locked position. Similarly, the locking ring may be rotated within the ring channel, insert, or track so that the locking ring splines align with the plurality of upper splines 69*a* and the plurality of lower splines 69*b* in the chamber 36 of the hammer 30 in the unlocked position. In this way, the locking ring splines may misalign with upper grooves 96 and lower grooves 98 of the tool 25 (see, e.g., FIGS. 7 and 8). For example, the locking ring may be rotated so that each of the locking ring splines are circumferentially positioned about halfway between each spline 69 of the plurality of upper splines 68*a* and each spline 69 of the plurality of lower splines 69*b* of the chamber 36. In this position, the tool 25 may be retained by the hammer 30 due to the now-misaligned locking ring splines contacting an edge (e.g., an upper bevel 110) of an upper surface 104 of the tool 25 and/or an edge (e.g., a lower bevel 112) of a lower surface 106 of the tool 25. In the unlocked state, the locking ring splines may align with the splines 69 such that the splines 69 and the locking ring splines are received in grooves of the tool 25 and allow the tool to slide longitudinally in or out of the chamber 36**.

Further, one or more of the locking ring splines may comprise a ring contact surface configured to abut the tool 25 when the tool 25 is inserted into the chamber 36. In some aspects, each of a plurality of locking ring splines has a ring contact surface that generally abuts the tool 25 when the locking mechanism 73 is in the locked position and slidably guides the tool when the locking mechanism 73 is in the unlocked position. At least one ring contact surface may include a treated ring layer applied to the ring contact surface. The treated ring layer may be similar to (e.g., may be formed in via the same technique, may have the same Rockwell Hardness Level as, may have a similar hardness profile throughout the regions of the locking ring spline, etc.) the treated layer 57 applied/formed on the support members 37. In some aspects, the treated ring layer may be configured to withstand approximately between 100 MPa to 320 MPa of pressure applied during the operation of the hydraulic hammer 30 without galling, concussive forces of the tool 25 without cracking/deforming, or the like.

Figure 7:
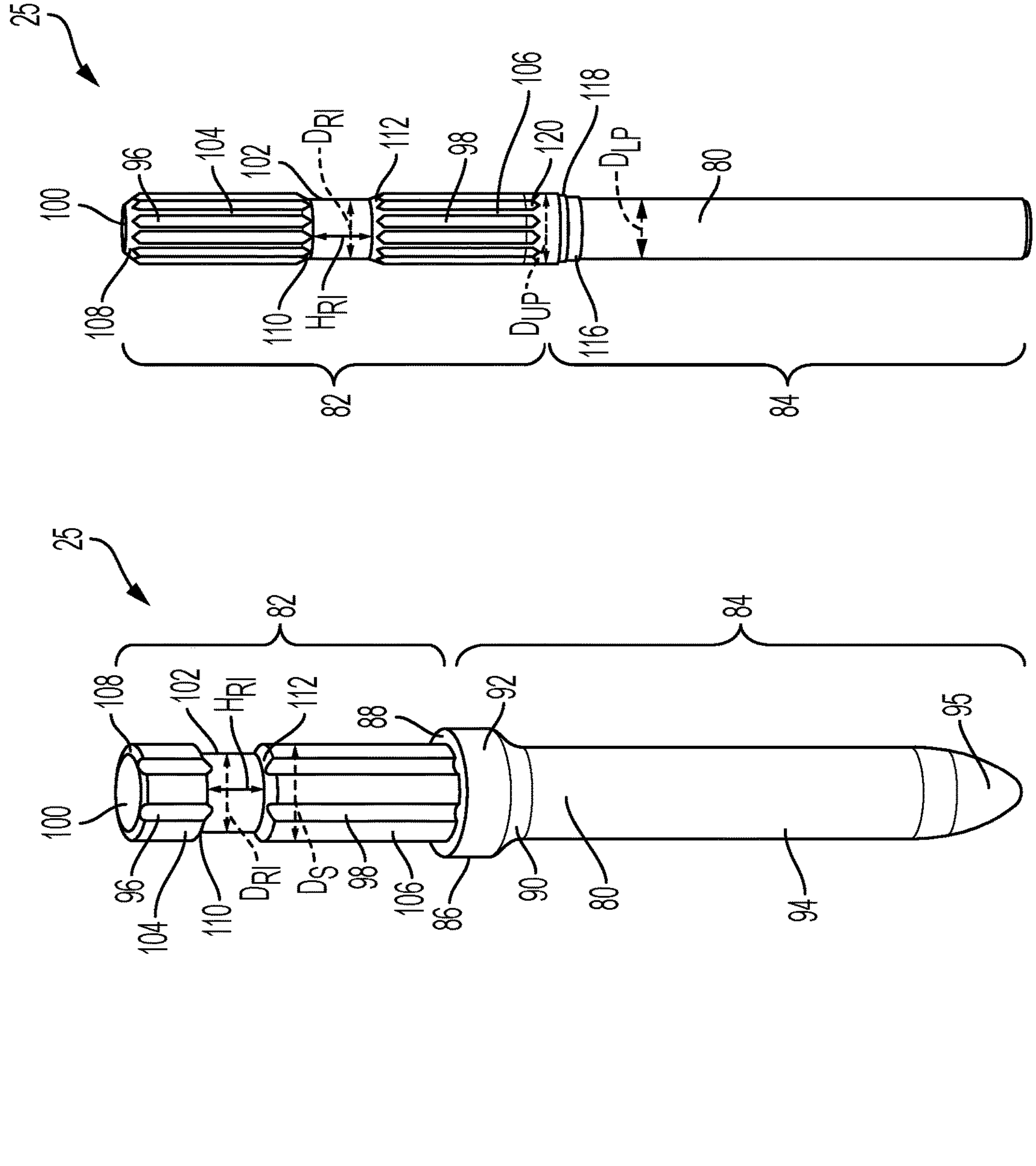
FIG. 7 is an illustration of an example work tool for a hydraulic hammer assembly according to an aspect of this disclosure.

Turning to FIG. 7, multiple example tools 25 are shown, according to various aspects. While like parts may be given like numerals, the features, dimensions, and materials may vary between the non-limiting embodiments shown and other embodiments contemplated by this disclosure. The tool 25 may include a shaft 80 comprising an upper portion 82 and a lower portion 84. The upper portion 82 of the shaft 80 may generally include a portion of the tool 25 that is received by the chamber 36 of the hammer 30. Conversely, the lower portion of 82 of the shaft 80 may generally include a portion of the tool 25 that protrudes from the hammer 30 and contacts the material being demolished.

The lower portion 84 of the shaft 80 may include a stop flange 86. The stop flange 86 may be disposed along the shaft 80 at a position abutting the upper portion 82 of the shaft 80. The stop flange 86 may include an upper edge 88 and a lower edge 90 joined by a circumferential surface 92. In an aspect, the lower edge 90 may be concavely beveled. The upper edge 88 may be normal to the shaft 80. The stop flange 86 may prevent the tool 25 from receding too far into the chamber 36 of the hammer 30. For example, the stop flange 86 may be configured with a diameter larger than the diameter of the opening 54 of the hammer 30 so that contact with the upper edge 88 of the stop flange 86 and the bottom surface 56 of the hammer 30 may prevent the tool 25 from further entering the hammer 30. Further, the stop flange 86 may be configured with a diameter larger than a general diameter of the shaft $D_S$. The diameter of the shaft $D_S$ may be generally constant in some embodiments (e.g., as shown in the left embodiment of FIG. 7) or may vary more significantly in other embodiments. For example, as shown in the right embodiment of FIG. 7, the tool 25 may be configured without a stop flange 86 and the tool may include an upper diameter $D_{UP}$ (e.g., a diameter of the upper portion 82) and a lower diameter $D_{LP}$ (e.g., a diameter of the lower portion 84) which may differ from one another. As shown in FIG. 7, the upper diameter $D_{UP}$ is slightly larger than the lower diameter $D_{LP}$ (e.g., by 1 mm-10 mm). Instead of a stop flange 86, the tool 25 may instead include a transition between the upper diameter $D_{UP}$ of the upper portion 82 and the lower diameter $D_{LP}$ of the lower portion 84. The transition may include one or more circumferential regions 116, 118 which may be beveled at the same or at different angles.

The lower portion 84 of the shaft 80 may further include a tool tip 94. The tool tip 94 may serve as the contact point between the tool 25 and the material being demolished. The tool tip 94 may comprise a conical point 95, as depicted in left embodiment of FIG. 7, configured to break up hard material. In other aspects, the tool tip 94 may alternatively be configured with blunt chisel (as shown in the right embodiment of FIG. 7), a moil point, a chisel point, a spade, a compaction plate, or another suitable end.

The upper portion 82 of the shaft 80 (e.g., the outer surface of the upper portion 82 of the shaft 80) may be configured to interconnect with elements of the hammer 30 to couple the tool 25 with the hammer 30. In particular, the upper portion 82 of the shaft 80 may include a plurality of upper grooves 96 and a plurality of lower grooves 98 disposed on an upper surface 104 and a lower surface 106, respectively. In another aspect, the tool 25 may have a single plurality of grooves running along the length of the upper portion 82. The tool 25 with grooves (e.g., upper grooves 96 and lower grooves 98) may be interoperable with a hammer 30 having support members 37 in the form of splines 69, elongated protrusions, or in other similar forms. In other embodiments, for example in embodiments where the support members 37 include recessed contact surfaces 39 (e.g., like the support members 37*e*), the tool 15 may have an upper portion 82 of the shaft 80 that may include protrusions, splines, elongated extensions or the like which may be received within the recessed contact surfaces 39 of the support members 37.

In the embodiments shown in FIG. 7, the upper grooves 96 and the lower grooves 98 may be configured to receive and interconnect with splines 69 (e.g., the plurality of upper splines 69*a* and the plurality of lower splines 69*b*, respectively), within the chamber 36 of the hammer 30. The upper grooves 96 and the lower grooves 98 may be longitudinally aligned. Since the upper grooves 96 and the lower grooves 98 may interconnect with the upper splines 69*a* and the lower splines 69*b*, the number, shape, and position of the upper grooves 96 and the lower grooves 98 may correspond with the number, shape, and position of the upper splines 69*a* and the lower splines 69*b*. For example, as in the embodiments depicted in FIGS. 5 and 8, the upper grooves 96 and the lower grooves 98 may each include a hemispherical shaped groove to securely receive each of the hemispherical shaped upper splines 69*a* and lower splines 69*b* when the tool is inserted into the chamber 36 of the hammer 30. In some embodiments, the upper grooves 96, lower grooves 98, and/or other surfaces of the tool 25 may also be treated with a hardened layer 57. In other embodiments, only the support members 37 may include the hardened layer 57.

In some embodiments, one or more variations of support members 37 may be combined with one or more variations of outer surfaces of the tool 25. For example, the upper portion 82 of the shaft 80 may include alternating upper grooves 96 and upper protrusions (e.g., hemispherical protrusions, semi-cylindrical protrusions, etc.) disposed radially around the upper surface 104 (e.g., a first upper groove 96, a first upper protrusion, a second upper groove 96, a second upper protrusion, a third upper groove 96, a third upper protrusion, etc.). The upper portion 82 of the shaft 80 may similarly include alternating lower grooves 98 and lower protrusions disposed radially around the lower surface 106, respectively. The upper grooves 96 may be longitudinally aligned with the lower grooves 98 and the upper protrusions may be longitudinally aligned with the lower protrusions. The tool 25 with upper protrusions, upper grooves 96, lower protrusions, and lower grooves 98 may be interoperable with a hammer 30 having support members 37 in the form of alternating splines 69 and recessed surfaces.

The upper grooves 96 may span from a top surface 100 of the tool 25 to a ring indentation 102. The top surface 100 and the upper surface 104 may be connected via a top bevel 108 and the ring indentation 102 and the upper surface 104 may be connected via an upper bevel 110. The upper grooves 96 may extend through the top bevel 108 and/or the upper bevel 110. The ring indentation 102 and the lower surface 106 may be connected via a lower bevel 112. The lower grooves 98 may extend through the lower bevel 112. The lower grooves 98 may span from the ring indentation 102 to the stop flange 86. In other embodiments, the lower grooves 98 may extend towards the transition between the upper portion 82 and the lower portion 84 of the tool 25. For example, the lower grooves may extend towards and stop approximately 0.5 inches to 3 inches from the one or more circumferential regions 116, 118. The lower grooves 98 may terminate at a lower beveled edge 120.

The ring indentation 102 may provide an indentation, with respect to the lower surface 106 and the upper surface 104, in the shaft 80 of the tool 25 that aligns with the locking mechanism 73 (e.g., a locking ring in the chamber 36 of the hammer 30). The ring indentation 102 may provide a space in which the locking ring splines of the locking ring 68 are rotationally unimpeded, such as when the locking ring is rotated to lock or unlock the tool 25 with the hammer 30. For example, the difference between the diameter $D_S$ of the shaft 80 at positions corresponding to the upper surface 104 and/or the lower surface 106 and the diameter $D_{RI}$ of the shaft 80 in the ring indentation 102 may be about equal or slightly more than equal to twice the height Hs of the locking ring spline of the locking ring (e.g., the maximum distance that the locking ring spline protrudes compared to an inner surface of the locking ring and/or the inner surface of the chamber 36). The ratio of the diameter $D_{RI}$ of the shaft 80 in the ring indentation 102 to the diameter $D_S$ of the shaft 80 at positions corresponding to the upper surface 104 and/or the lower surface 106 (i.e., the unindented portions of the shaft) may be about 0.75. In an aspect, the ratio of the diameter $D_{RI}$ of the shaft 80 in the ring indentation 102 to the diameter $D_S$ of the shaft 80 at positions corresponding to the upper surface 104 and/or the lower surface 106 (i.e., the unindented portions of the shaft) may be in a range from about 13/16 to about 5/8. The height $H_{RI}$ of the ring indentation 102 may be greater than the height $H_{LR}$ of the locking ring to allow limited longitudinal movement of the tool 25 when the tool 25 is struck by the piston 38. The ratio of the height $H_{LR}$ of the locking ring to the height $H_{RI}$ of the ring indentation 102 may in a range from about 3/4 to about 1.

Figure 8A:
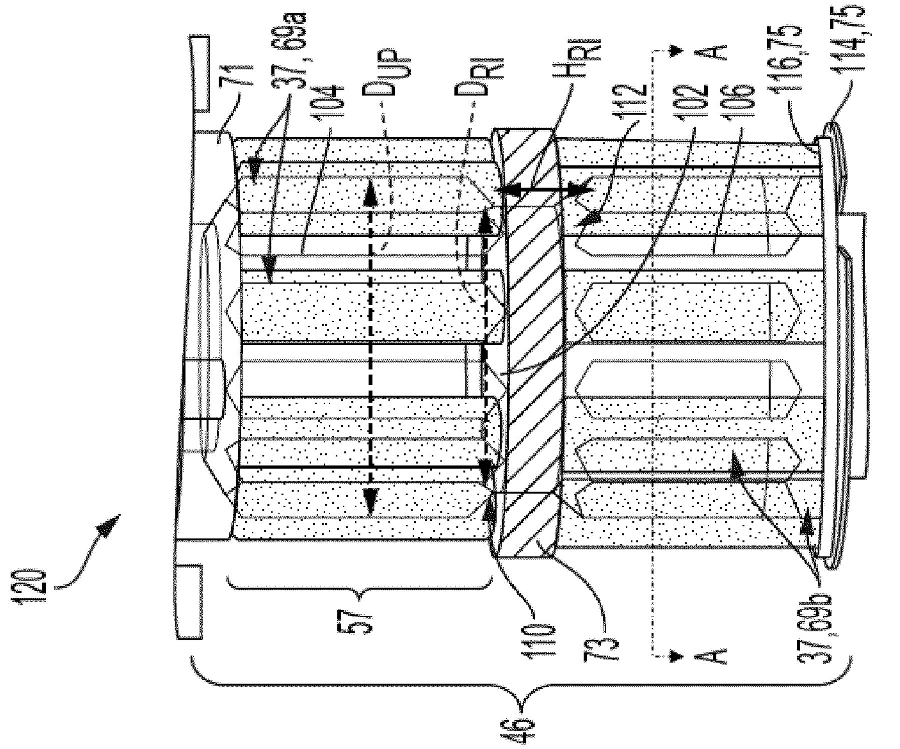
FIG. 8A is an illustration of example support members, for a hydraulic hammer, having a treated layer thereon configured to define a greaseless interface between a contact surface and a surface of a work tool, according to an aspect of this disclosure.
Figure 8B:
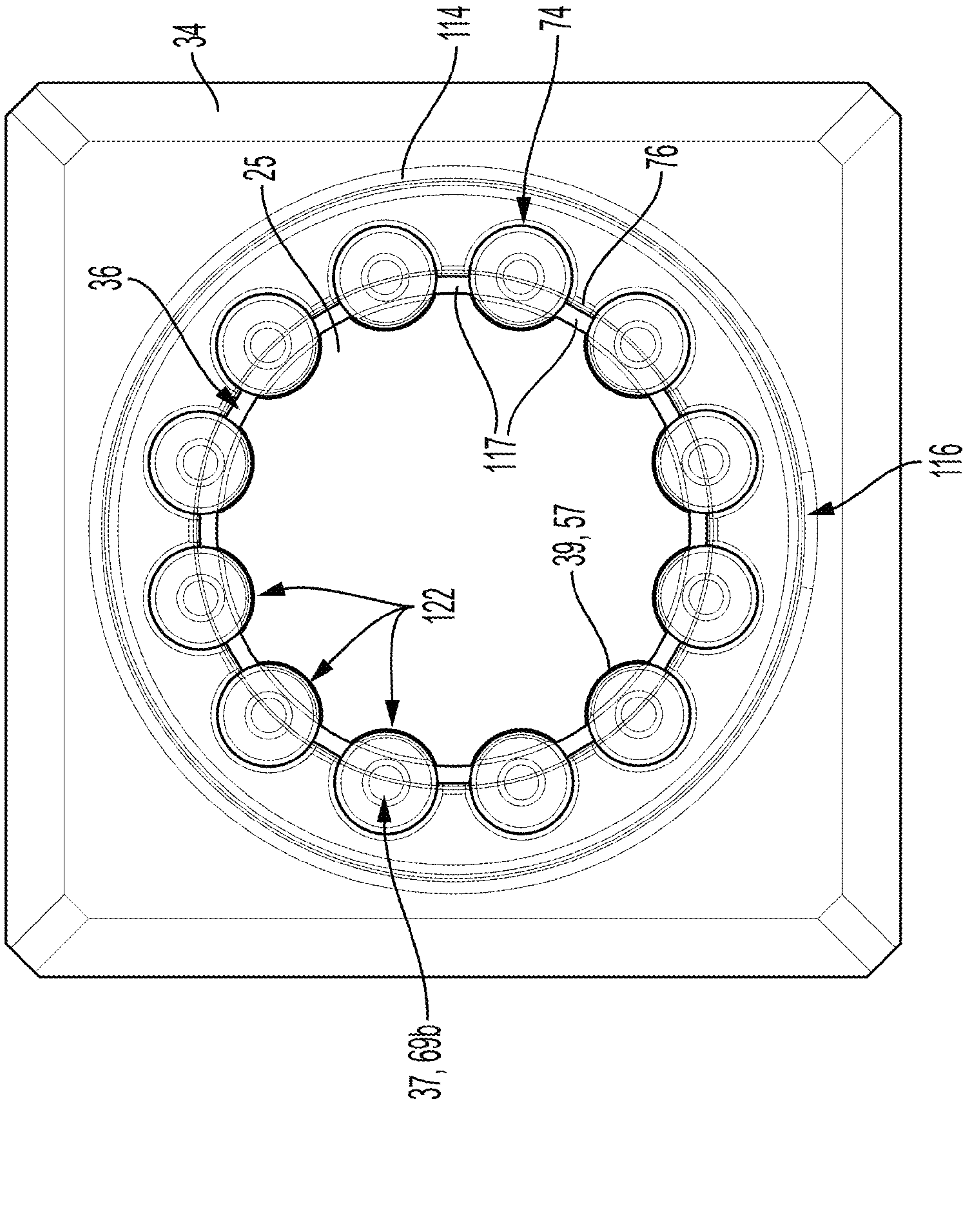
FIG. 8B is a top-down cross-sectional view, taken along plane A-A in FIG. 8A, showing an example configuration of the support members and work tool defining the greaseless interface within a hosing of the hydraulic hammer.
Figure 9:
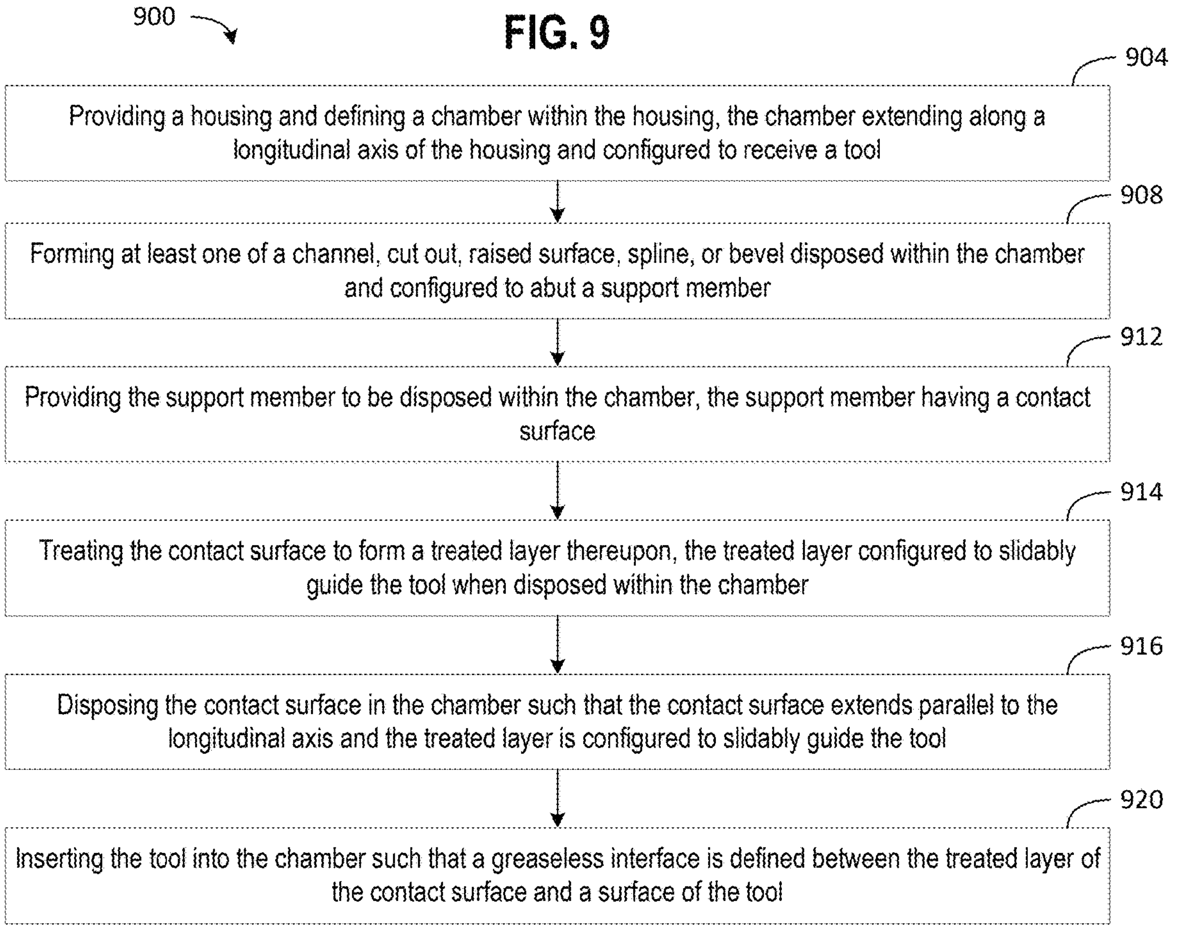
FIG. 9 is a flowchart showing example steps of a method for assembling a hydraulic hammer according to this disclosure.

Turning to FIG. 8A, example support members 37 for a hydraulic hammer 30 of FIG. 5 are shown with the housing 34 removed. The support members 37 are in the form of splines 69 (e.g., the upper plurality of splines 69*a* and the lower plurality of splines 69*b*) having a treated layer 57 thereon and defining a greaseless interface 122 (shown best in FIG. 8B) between each contact surface 39 of the support members 37 and the respective surfaces (e.g., upper grooves 96 and lower grooves 98) of the work tool 25. As shown in FIGS. 8A and 8B, the splines 69 may radially surround the tool 25 and may be spaced equidistant around the perimeter of the tool 25. The plurality of upper splines 69*a* have a portion thereof (e.g., the inner region 61) adjacent to/abutting/configured to engage the tool 25. Specifically, the contact surfaces 39 are mostly not visible in FIG. 8A and/or from a viewpoint outside of the hydraulic hammer 30 because they are proximate to, received within the upper grooves 96 and lower grooves 98 of the tool 25, or are otherwise abutting/supporting/engaging the outer surface of the tool 25. In other words, as shown in FIG. 8B, the contact surface 39 and the greaseless interface 122 defined between the treated layer 57 of the contact surfaces 39 of the support members 37 and the surface of the work tool 25 may comprise the portions of the support members 37 and the work tool 25 that engage and/or come into contact with each other during operation of the hydraulic hammer 30.

The plurality of upper splines 69*a* have a top end abutting and supported by the stop ring 71 and a bottom end abutting and supported by the locking mechanism 73 (e.g., the locking ring). The ring indentation 102 of the tool 25 has a height $H_{RI}$ that is larger than a height of the locking mechanism and/or the locking ring. Accordingly, the tool 25 may be slidably guided by the splines 69 in contact with the grooves as the tool shifts up and down. Specifically, the work tool 25 may shift between an upper position (not represented in FIG. 8A) where the locking ring abuts the lower bevel 112 of the ring indentation 102 and a lower position (represented best in FIG. 8A) where the locking ring abuts the upper bevel 110 of the ring indentation 102. As the locking ring splines may experience repeated percussion between the upper bevel 110 and the lower bevel 112, in some embodiments, the locking ring splines, the locking ring, and/or the locking mechanism 73 may include the treated layer 57.

The plurality of lower splines 69*b* similarly have a top end abutting and supported by the locking mechanism 73 and a bottom end abutting and supported by the inserts (e.g., a snap ring 114, a ring-shaped end cap 116) that are disposed within and/or coupled to the housing 34. The lower end of the tool 25 extends downward and towards the worksite/material to be demolished. Accordingly, no grease application systems, zerk fittings, lubricant channels, or the like are required and the hammer 30 and hammer assembly 20 may be more compact and less inclined to experience malfunction compared to hammer assemblies utilized automatic greasing systems, grease reservoirs, or the like. Beneficially, the greaseless interface 122 is defined at the contact surfaces 39 between the treated layers 59 of the support members 39 and/or locking mechanism 73 of the hammer and allows for the extended use, increased degradation resistance, and other benefits discussed herein.

Turning to FIG. 8B, a top-down cross-sectional view is shown of the hydraulic hammer 30, taken along plane A-A in FIG. 8A, illustrating an example configuration of the support members 37 engaging the work tool 25 to define the greaseless interface 122 within the housing 34. As shown in FIG. 8B, the housing 34 may form an outer casing configured to hold and/or otherwise support the components that form the greaseless interface 122 (e.g., the support members 37 and the work tool 25). The support members 37 such as the lower plurality of splines 69*b* (shown here in a semi-transparent manner) may be secured within channels 74 of the housing 34 by the ring-shaped end cap 116 held in place by the snap ring 114 (both below the lower plurality of splines 69*b* and toward the bottom surface 56 of the housing 34 as best seen in FIG. 5. Ridges 76 of the housing 34 may separate the perimeter of one support member 37 from the perimeter of another support member 37 or otherwise create a space/gap 117 between, the housing 34, the support members 37, and/or the work tool 25. For example, as seen in the cross section of FIG. 8A, the chamber 36 may include a ring of gaps 117 surrounding the work tool 25 and located between adjacent support members 37.

Accordingly, in some embodiments, the surface of the work tool 25 may directly contact only the support members 37 and the locking mechanism 73, the piston 38, and the like (e.g., may not directly contact the housing 34). In this way, some or all of the force/pressure applied between the work tool 25 and the support members 37 during operation of the hammer 25 may occur at the greaseless interface 122. In some embodiments, the greaseless interface 122, as shown in FIG. 8B, may be defined as the cumulative portions of the treated layer 57 on the contact surfaces 39 of the support members 37 that directly contact the work tool 25 during operation of the hydraulic hammer 30.

INDUSTRIAL APPLICABILITY

The systems and methods described herein have industrial applicability in various use cases, environments, and settings that can be readily appreciated from the foregoing discussion. The hammer assembly 20 having a greaseless interface 122 may be used in conjunction with a variety of machines, including an excavator, a backhoe loader, and the like. The hammer assembly 20 may be used, for example, to break apart or demolish structures or raw materials composed of a variety of hard materials such as quarried rock, concrete, or asphalt without requiring intermittent pauses/breaks to apply grease and in a larger variety of work sites.

According to some embodiments, the greaseless hammer system and support member 37 disclosed herein may beneficially be constructed in a streamlined manner that provides materials savings and other advantages compared to the manufacturing and assembling of conventional hydraulic hammers. For example, a method 900 of assembling a hydraulic hammer assembly 20 is shown according to some aspects.

In some aspects, the method 900 may include step 904 of providing a housing 34 as described above. For example, the housing 34 may be similar to the housing shown in FIG. 6 and may be machined from durable materials (e.g., metals, composite materials, alloys, or the like). Step 904 may further define the chamber 36 within the housing 34 such that the chamber 36 extends along a longitudinal axis 35 of the housing 34. The housing 34 may be assembled by coupling together one or more sections (e.g., an upper section configured to house a piston 38 and hydraulic system and a lower section configured to house the system for providing a hydraulic hammer 30 having a greaseless interface 122 discussed herein). The chamber 36 may be centered in the housing and have a suitable diameter and lower opening 54 configured to receive a tool 25.

In some aspects, the method 900 may further include step 908 of forming at least one of a channel, cut out, raised surface, spline, groove, bevel, or the like disposed within the chamber 36. The channel, cut out, or the like may be machined, cast molded, or otherwise formed to have a profile configured to abut a support member 37. In some aspects, the channel, cut out, etc. may be configured to couple or slidably receive the support member 37 in the housing 34. In this way, following extended operation of the hammer assembly 20 or if the support member wears out, the support member 37 may be removed (e.g., by removing inserts 75, sliding the support member 37 from the channels or the like, and installing new support members 37). In some embodiments, the contact surface 39 may comprise at least a portion of the at least one cut out, raised surface, spline, or bevel. For example, in some embodiments, the splines 69 and/or the recessed support members 37*e* may be integrally formed with the housing 36. In some aspects, this step may include forming a plurality of recesses/channels 74 on the inner surface of the chamber as shown for example in FIG. 6. In this way, each of the plurality of channels 74 may be configured to receive one or more of the plurality of splines 69 and may include a hardened surface 79 thereupon to reduce wear of the housing 34.

In some aspects, the method 900 may include step 912 of providing the support member 37 to be disposed within the chamber 36. The support member 37 may be formed via any suitable method (e.g., casting, additive manufacturing, machining, etc.) and have a contour, outside surface, edge, or the like configured to act as the contact surface 39 that slidable guides the tool 25. In some aspects, such as when the contact surface is integrally formed with the chamber 36, this step may include providing/forming the contact surface 39 within the chamber 36 such that the contact surface 39 extends parallel to the longitudinal axis 35. In this way, the contact surface may first be formed in the chamber 36 then subsequently treated to apply the treated layer 57 thereto. In other aspects, this step may include providing the plurality of splines 69, each spline 69 having an outer surface (e.g., a cylindrical surface, a hemi-spherical surface, or the like).

Beneficially, manufacturing the support members 37 such as the plurality of splines 69, for example, may result in reduced material costs and may simplify/speed up the manufacturing process. For example, conventional (e.g., greased) wear bushings may be required to be machined from large starting blocks/quantities of material. Machining down the material to create the wear bushings creates waste (e.g., in the form of metal swarf, chips, shavings, or the like). In some embodiments, the material used to make a plurality of splines 69 may be less than the material wasted when making conventional wear bushings-greatly reducing the total material needed to manufacture the hammer 30 and the associated material and manufacturing costs. Further, machining the splines eliminates the need to machine grease flow paths, channels, or other opening that add complexity to the manufacturing/assembly process.

In some aspects, the method 900 may include step 914 of treating the contact surface 39 to form a treated layer 57 thereupon. In some embodiments, forming the treated layer 57 may comprise applying a carbide coating, applying a cladding, treating the contact surface 39 via a carburizing process, treating the contact surface via a carbonitriding process, or applying a diamond light carbon (DLC) coating to the contact surface 39. In this way, the treated layer 59 may have a surface area having hardness value in a range of about 45 HRC to about 65 HRC configured to slidably guide the tool when disposed within the chamber. Specifically, in one embodiment, at least a portion of the contact surface 39 and/or the support member 37 may be heated (e.g., heating the outer surface of at least one of the plurality of splines) to approximately 850° C. in the presence of ammonia gas followed by quenching the contact surface 39 to form the treated layer 57.

In some aspects, the method 900 may include step 916 of disposing the support member 37 and/or the contact surface 39 in the chamber 36 such that the contact surface 39 extends parallel to the longitudinal axis 35 and the treated layer 57 is configured to slidably guide the tool 25. For example, as shown in FIG. 5, the plurality of splines 69 are disposed on an inner surface (e.g., in the channels 74) of the chamber 36 such that each of the plurality of splines 69 extends parallel to the longitudinal axis 35 and extend towards the center of the chamber 36 to allow the contact surface 39 comprising the treated layer 57 to slidably guide the tool 25 when the tool 25 is inserted within the chamber 36. The support members 37 may be disposed in the chamber by first inserting the stop ring 71 at the top of the chamber 36, inserting the upper plurality of splines 69*a* in the respective channels 74 of the housing, inserting the locking ring to secure the upper plurality of splines 69*a* between the locking ring and the stop ring 71, inserting the lower plurality of splines 69*b*, then inserting the inserts 75 (e.g., the ring-shaped end cap 116 and the snap ring 114) to close the housing 34 and secure the lower splines 69*b* in place.

In some aspects, the method may include an additional step of disposing the locking mechanism 73 within the housing and coaxial to the contact surfaces 39 as described above. The locking ring may be formed with at least one protrusion or locking spline on the locking ring such that a longitudinal rotation of the locking ring selectively aligns the at least one protrusion or locking spline with the contact surface. Additionally, the method 900 may further comprise treating a ring contact surface of the at least one protrusion or locking spline of the locking ring to form the treated layer 57 thereupon. The ring contact surface may be treated with at least one of a carbide coating, a cladding, a carburizing process, a carbonitriding process, or a diamond light carbon (DLC) coating and may be disposed between, for example, the upper plurality of splines 69*a* and the lower plurality of splines 69*b*.

In some aspects, the method 900 may include step 920 of inserting the tool 25 into the chamber 36 such that a greaseless interface 122 is defined between the treated layer 57 of the contact surfaces 39 and a surface of the tool. For example, the surface of the tool 25 may include an outer surface of the tool and specifically may include upper grooves 96 and lower grooves 98 defined thereon that are shaped to slidingly abut the support members 37 (e.g., splines 69). In this way, the greaseless interface 120 is configured to, without lubricant, prevent galling during an operation of the hydraulic hammer. In some embodiments, the greaseless interface 122 may withstand approximately between 100 MPa to 320 MPa of pressure applied during the operation of the hydraulic hammer without galling.

Figure 10:
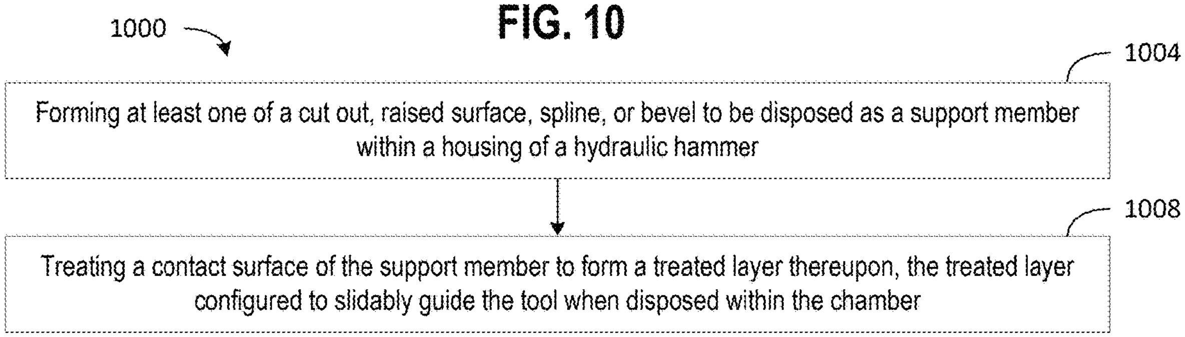
FIG. 10 is a flowchart showing example steps of a method for creating a support member for a greaseless hydraulic hammer according to this disclosure.

Turning to FIG. 10, the disclosure also includes a method 1000 for forming and treating support members 37 configured to define the greaseless interface 122 in a hydraulic hammer assembly 20. At step 1004, the method 1000 may include forming at least one of a cut out, raised surface, spline 69, or bevel to be disposed as a support member 37 within a housing 34 of a hydraulic hammer 30. Example support members 37 include those discussed above and shown in FIG. 4. Specifically, in one aspect, the method 1000 may include forming the spline 69 with steel having a carbon content greater than about 0.58% by weight, the spline 68 having a longitudinal length of about 4 to 8 inches and an outer surface that is cylindrical or hemispherical in shape. Further, in some aspects, the spline 69 may have a radius perpendicular to the longitudinal length that is about 10 to 20 mm.

At step 1008, the method 1000 may include treating a contact surface 39 of the support member 37 to form a treated layer 57 thereupon, the treated layer 57 configured to slidably guide the tool 25 when disposed within the chamber 36. The treating process may include one or more of applying a carbide coating, applying a cladding, treating the contact surface via a carburizing process, treating the contact surface via a carbonitriding process, or applying a diamond light carbon (DLC) coating to the contact surface.

During use/operation of the hydraulic hammer assembly 30, the support member(s) 37 (e.g., at least a portion of the treated layer 57 of the contact surface 39 thereof) are in contact with the tool 25 and often have relatively significant forces imparted along the contact surface 39 by the tool 25. Advantageously, the systems and methods disclosed herein provide the support member(s) 37 that are configured to resist various modes of wear and mechanical failure. In general, the movement of the tool 25 may wear out the contact surface 39 of the support member 37 that is in contact with the outer surface of the tool 25. However, by applying the treated layer 57 to the contact surface 39 and by configuring the support members 37 such that the contact surface 39 and the treated layer 57 thereof results in reduced contact pressure between the tool 25 and the support member 37 (e.g., by varying the clearance and total surface area of the contact surface 39 in contact with the tool 25), wear can be prevented/mitigated and operation of the hammer assembly 20 may occur without the application of lubricant and/or grease between the support members 37 and the tool 25. Specifically, in some embodiments, the support members 37, contact surfaces 39, and the treated layers 57 thereof may be configured to withstand approximately between 100 MPa to 320 MPa of pressure applied during greaseless operation of the hydraulic hammer (e.g., 2 hours, 4 hours, 8 hours, etc. demolishing concrete) without galling or experiencing surface wear greater than 2-5 mm.

In contrast, conventional wear bushings that require lubricant/grease experience wear and require routine replacement. In this way, conventional wear bushings are replaced on a regular basis and/or on a maintenance schedule as the wear bushing degrade during the use of the hydraulic hammer assembly. Conventional wear bushings may be a consumable part and regular maintenance and replacement of the conventional wear bushings results in downtime at a construction or mining site, as well as a cost (e.g., parts cost, labor cost, opportunity cost of downtime, etc.). Further, conventional wear bushings require the added cost of downtime and materials for frequent grease application to the interface between the tool 25 and the wear bushing. Further, some geographic regions, locales, regulations, etc. restrict the area in which grease-using hydraulic hammer assemblies 20 may function to prevent the excessive spilling of grease/lubricant—which often drips/leaks from the chamber of a greased hammer assembly—at a work site. In this way, hydraulic hammer assemblies requiring grease/lubricant are both more subject to wear and more cost prohibitive than the greaseless hydraulic hammer assemblies 20 disclosed herein. Advantageously and desirably, the greaseless hydraulic hammer assemblies 20 of the present disclosure and the support members 37, contact surfaces 39, and treated layers 57 thereof minimize the frequency of downtime resulting from replacement of support components in the hydraulic hammer 30, experience lower contact pressures at the greaseless interface, and thus may experience lower rates of wear when compared to hammers utilizing conventional support bushings in addition to eliminating the cost and downtime associated with the application of grease/lubricant.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the various embodiments is illustrative only. Additionally, any element disclosed in one embodiment may be incorporated or utilized with any other embodiment disclosed herein.

What is claimed is:

1. A hydraulic hammer comprising:

a housing defining a chamber extending along a longitudinal axis configured to receive a tool;

a plurality of splines disposed on an inner surface of the chamber, the plurality of splines extending parallel to the longitudinal axis, each of the plurality of splines having a contact surface configured to slidably guide the tool when disposed within the chamber;

a treated layer applied to the contact surface of each of the plurality of splines, the treated layer configured to withstand approximately between 100 MPa to 320 MPa of pressure applied during an operation of the hydraulic hammer without galling; and wherein an interface is defined between the contact surface of each of the plurality of splines and a surface of the tool and is configured to facilitate sliding engagement between the contact surface of each of the plurality of splines and the surface of the tool without lubricant during the operation of the hydraulic hammer.

2. The hydraulic hammer of claim 1, wherein the treated layer comprises at least one of a carbide coating, a cladding, a carburized surface, a carbonitrided surface, or a diamond light carbon (DLC) coating.

3. The hydraulic hammer of claim 1, wherein the treated layer of one or more of the plurality of splines comprises steel permeated with carbon and nitrogen formed by heating the contact surface to approximately 850° C. in a presence of ammonia gas then quenching the contact surface of each of the plurality of splines.

4. The hydraulic hammer of claim 1, wherein a sum of a surface area of each treated layer of the plurality of splines exceeds 0.2 $m^2$.

5. The hydraulic hammer of claim 1, wherein the treated layer of one or more of the plurality of splines has a hardness in a range of about 45 Rockwell Hardness Scale C (HRC) to about 65 HRC.

6. The hydraulic hammer of claim 1, further comprising:

a plurality of recesses formed on the inner surface of the chamber, each of the plurality of recesses configured to receive one or more of the plurality of splines;

wherein the plurality of splines comprises:

a plurality of upper splines disposed on an upper portion of the inner surface of the chamber, a plurality of lower splines disposed on a lower portion of the inner surface of the chamber; and a locking mechanism disposed within the chamber between the plurality of upper splines and the plurality of lower splines, the locking mechanism configured to selectively secure the tool within the housing.

7. The hydraulic hammer of claim 6, wherein the locking mechanism further comprises:

a locking ring rotatable about the longitudinal axis with respect to the housing, the locking ring comprising a plurality of locking ring splines disposed on an inner surface of the locking ring; and wherein:

a longitudinal rotation of the locking ring selectively aligns the plurality of splines with the plurality of locking ring splines.

8. The hydraulic hammer of claim 7, wherein:

each of the plurality of locking ring splines has a ring contact surface configured to abut the tool when the tool is inserted into the chamber; and at least one ring contact surface comprises a treated ring layer applied to the ring contact surface, the treated ring layer configured to withstand approximately between 100 MPa to 320 MPa of pressure applied during the operation of the hydraulic hammer without galling.

9. A method of assembling a hydraulic hammer, the method comprising:

providing a housing;

defining a chamber within the housing, the chamber extending along a longitudinal axis of the housing and configured to receive a tool;

providing a plurality of splines, each of the plurality of splines having an outer surface;

treating the outer surface of each of the plurality of splines to form a treated layer thereupon;

disposing the plurality of splines on an inner surface of the chamber such that each of the plurality of splines extends parallel to the longitudinal axis, each of the plurality of splines having a contact surface, comprising the treated layer, configured to slidably guide the tool when disposed within the chamber;

inserting the tool into the chamber such that an interface is defined between the contact surface of each of the plurality of splines and a surface of the tool during an operation of the hydraulic hammer; and wherein the treated layer is configured to, without lubricant, withstand approximately between 100 MPa to 320 MPa of pressure applied during the operation of the hydraulic hammer without galling.

10. The method of claim 9, wherein treating the outer surface comprises at least one of applying a carbide coating, applying a cladding, treating the contact surface via a carburizing process, treating the contact surface via a carbonitriding process, or applying a diamond light carbon (DLC) coating.

11. The method of claim 9, further comprising heating the outer surface of at least one of the plurality of splines to approximately 850° C. in the presence of ammonia gas then quenching the outer surface.

12. The method of claim 9, wherein a sum of a surface area of each treated layer of the plurality of splines exceeds 0.2 $m^2$.

13. The method of claim 9, wherein the contact surface of one or more of the plurality of splines has a hardness in a range of about 45 HRC to about 65 HRC.

14. The method of claim 9, further comprising:

forming a plurality of recesses on the inner surface of the chamber, each of the plurality of recesses configured to receive one or more of the plurality of splines;

wherein providing the plurality of splines further comprises:

providing a plurality of upper splines disposed within the plurality of recesses on an upper portion of the inner surface of the chamber, providing a plurality of lower splines disposed within the plurality of recesses on a lower portion of the inner surface of the chamber; and disposing a locking mechanism within the chamber between the plurality of upper splines and the plurality of lower splines, the locking mechanism configured to selectively secure the tool within the housing.

15. The method of claim 14, wherein:

the locking mechanism comprises a locking ring rotatable about the longitudinal axis with respect to the housing; and further comprising: forming a plurality of locking ring splines on an inner surface of the locking, and disposing the locking ring between the plurality of upper splines and the plurality of lower splines such that a longitudinal rotation of the locking ring selectively aligns the plurality of locking ring splines with the plurality of splines.

16. The method of claim 15, further comprising treating a ring contact surface, such that a treated ring contact surface is configured to abut the tool when the tool is inserted into the chamber; and wherein:

the ring contact surface is treated with at least one of a carbide coating, a cladding, a carburizing process, a carbonitriding process, or a diamond light carbon (DLC) coating.

17. A method of manufacturing a spline for a hydraulic hammer, the method comprising: forming the spline with steel having a carbon content greater than about 0.58% by weight, the spline having a longitudinal length of about 4 to 8 inches and an outer surface; and treating the outer surface of the spline with at least one of a carbide coating, a cladding, a carburizing process, a carbonitriding process, or a diamond light carbon (DLC) coating.

18. The method of claim 17, wherein:

the spline is cylindrical or hemispherical in shape; and a radius of the spline perpendicular to the longitudinal length is about 10 to 20 mm.

19. The method of claim 17, wherein the treated outer surface of the spline has a hardness in a range of about 45 HRC to about 65 HRC.

20. The method of claim 17, further comprising:

heating the spline to a temperature of at least about 850° C. in the presence of an ammonia gas; and quenching the spline directly from the temperature at which the heating is performed to form a hardened spline.

* * * * *